United States Patent [19]
Stewart et al.

[11] 3,721,021
[45] March 20, 1973

[54] READING PACER DEVICE

[76] Inventors: Merrick W. Stewart, 5 Oriole Drive, Essex County, Mass. 01810; Gerard J. Marks, 9403 Stateside Court, Montgomery County, Md. 20903

[22] Filed: May 24, 1971

[21] Appl. No.: 146,113

[52] U.S. Cl. ................................................. 35/35 B
[51] Int. Cl. ................................................. G09b 17/04
[58] Field of Search ..................................... 35/35 B

[56] References Cited

UNITED STATES PATENTS

| | | | |
|---|---|---|---|
| 2,162,766 | 6/1939 | Taylor | 35/35 B |
| 3,126,648 | 3/1964 | Strong et al. | 35/35 B |
| 3,262,219 | 7/1966 | Bristol | 35/35 B |
| 3,264,759 | 8/1966 | Simpson | 35/35 B |

Primary Examiner—Wm. H. Grieb
Attorney—W. Warren Taltavull

[57] ABSTRACT

The disclosure embraces a reading pacer device having a supporting surface for reading material and a pacer bar mounted for traversing the reading material; a variable speed electric motor is provided for moving the pacer bar and an electronic circuit is provided including limit switches for controlling the operation of the motor to vary the speed of the motor to correspond to a pre-selected number of words per unit of area of reading material traversed by the pacer bar.

10 Claims, 6 Drawing Figures

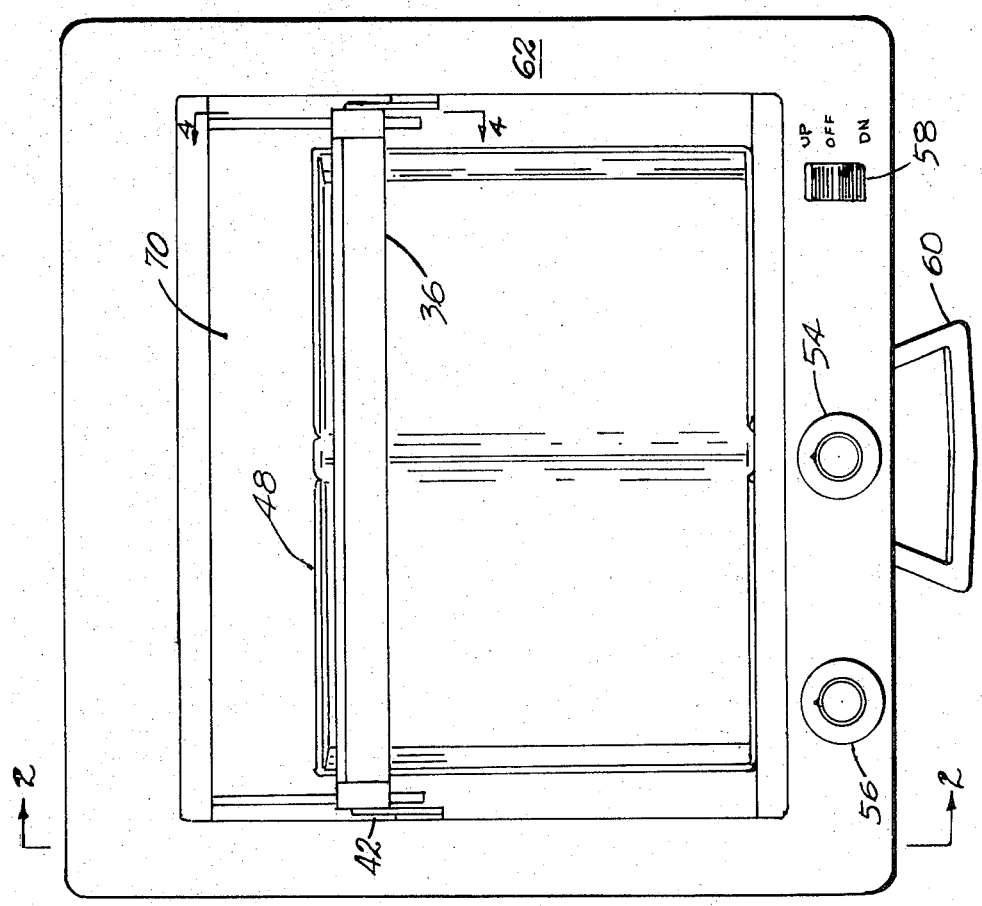
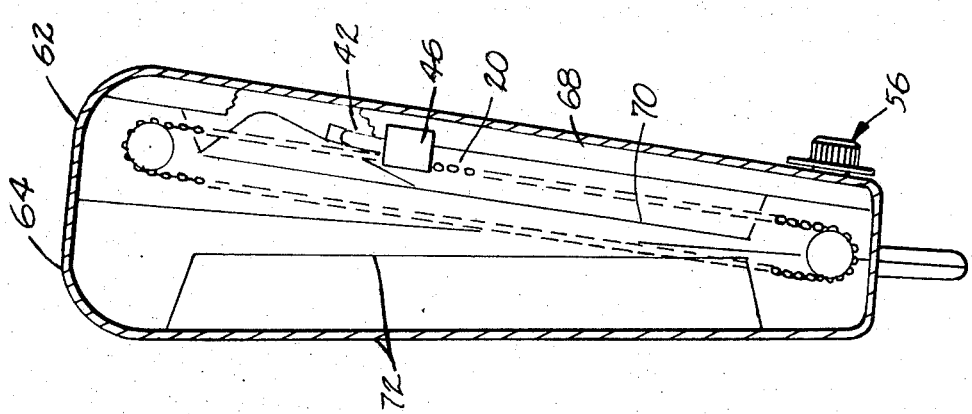
INVENTORS
MERRICK W. STEWART
AND GERARD J. MARKS
BY W. Warren Tattavull
Their Agent

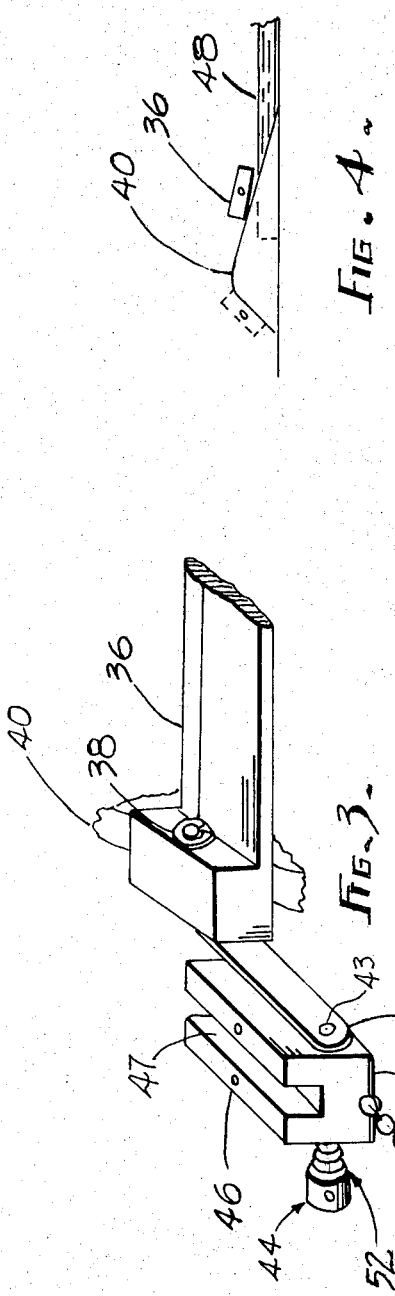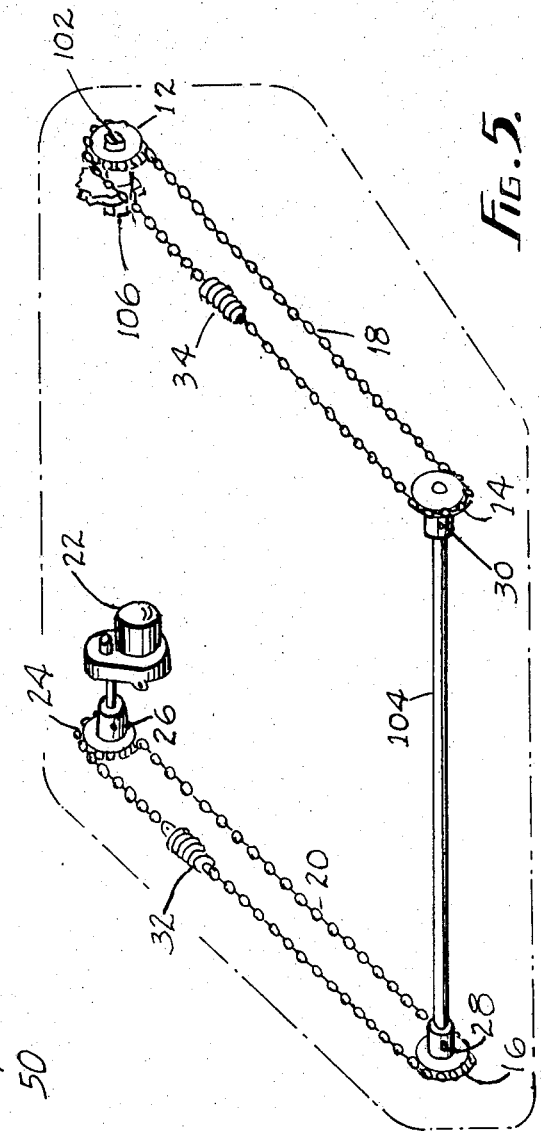

READING PACER DEVICE

This invention relates to a dynamic reading pacer device the use of which will improve the user's reading ability.

Machines of this type comprise a pacer bar mechanically moved over the surface of the reading material at a controlled or predetermined rate. However, such machines at present are of relatively expensive construction and utilize many complicated speed control devices which can introduce problems in terms of accuracy. Other disadvantages of the prior art machines include a lack of direct means for determining a reader's reading ability, the inability of reading a book of one's choice, the inconvenience of manually returning the pacer bar to the top of each page, the need for making reading device adjustments to obtain the optimum reading material angle.

It is a principal object of the present invention to provide an inexpensive dynamic reading pacer device of simple, light weight construction for ease of portability, utilizing electronic and mechanical components to insure overall accuracy, having a simple computerized readout that permits the reader to ascertain his reading ability directly, provides for reading a book of one's choice, has means for rapidly returning the pacer bar to the top of the reading material permitting the turning of the page without interference by the pacer bar, and insures the optimum reading material angle without adjustments of any sort, all of which features are built into a specially designed carrying case housing with a handle for ease of portability.

Further objectives of the invention are to provide a quiet driving mechanism and a simple electronic computerized controller which will permit accurate and adjustable control of a pacer bar movement rate over the limit of its movement. For a given control setting, the movement of the pacer bar maintains a constant rate during the reading cycle and will move rapidly through the return cycle if switched by the operator. Other objectives of the invention are to provide a device that allows the turning of the pages of the reading material without interference with such reading material by the pacer bar and this same device permits displacement of the pacer bar over the reading material in a smooth manner for the continuation of the traversing cycle without mechanical manipulation by the operator.

With the above stated objects in view the dynamic reading pacer device of the present invention includes a housing, two tension arms supporting a pacer bar under spring pressure, and an electronically controlled drive mechanism with a control feature being adapted to regulate the passage of the pacer bar over reading material placed on the housing.

The traversing parts of the drive mechanism comprise two tension arms extending from the housing. The inner ends of each of the tension arms are attached to corresponding carriages of the driving mechanism; the outer ends of each tension arm allow rotation and translation of the pacer bar. Spring tension is maintained between the inner part of each arm and carriage so that the pacer bar presses lightly against the reading material and each carriage is kept on its respective rail located within the housing. As the pacer bar approaches its return limit of travel, the pacer bar is caused to move up and off the reading material by two raised cam surfaces located on the housing at the outer ends of the pacer bar so as to allow the operator to turn the page of the reading material without mechanical interference with the pacer bar.

The driving mechanism for the pacer bar of the present invention includes a D. C. or universal motor mounted in the housing which is drivingly connected to one flexible endless belt or chain which in turn is connected to another flexible belt or chain mounted in the housing on the side opposite the first mentioned belt or chain. Two flexible drive elements are interconnected by a shaft having a pulley at each end. One flexible drive element is driven by pulley attached to the motor output shaft and the other flexible element is driven by said pulley/shaft combination and is supported at its opposite end by an idler pulley attached to the housing.

The motor voltage is controlled by a simple electronic control circuit comprised of said electric motor, a three position switch, two potentiometers (or equivalent multiposition switches to resistors across its terminals and performing resistance variation in steps), rectifiers, silicon controlled rectifiers (sometimes called SCR's or thyristors), resistors and limit switches. During the reading cycle, the electronic control circuit which has computer features provides half wave control of said motor and is a direct coupled SCR with voltage feedback and makes use of counter electromotive force (emf) induced in the armature of said motor since the said emf is an indication of speed changes corresponding to mechanical load variations. When the said three position switch is switched to quick return, a simple half wave rectifier circuit is utilized to provide negative half wave voltage pulses to the motor. The limit switches stop the motor at each limit of pacer bar travel and the center position of the said three position switch allows the operator to stop the pacer bar at will. The potentiometers of the circuit are connected in a manner to perform a simple analog computer function of division. When the number of words in a given reading area (that is: words per inch) is fed into the device by adjustment of the "words/inch" potentiometer, the reading speed (viz: words per minute) can be read by the setting of the reading speed potentiometer corresponding to the reading capability of the operator. The signal fed to the motor is a function of the pacer bar displacement speed.

In order that the invention may be more readily understood, reference will now be made to the accompanying drawings illustrating a practical embodiment of a dynamic reading pacer device constructed in accordance with the present invention. In these drawings:

FIG. 1 is a plan view illustrating the dynamic reading pacer device in a operative position with a book constituting the reading material placed thereon over which the pacer bar traverses under control of the drive mechanism;

FIG. 2 is a side elevation along lines 2—2 of FIG. 1 illustrating the motor drive of the pacer bar mechanism;

FIG. 3 is an enlarged perspective view showing the carriage assembly of the pacer bar mechanism;

FIG. 4 is an enlarged view taken along line 4—4 of FIG. 1 illustrating the operation of the raised cam surfaces;

FIG. 5 is a perspective view of the mechanical drive system including the motor but without details of the housing and pacer bar mechanism;

Figure 6:
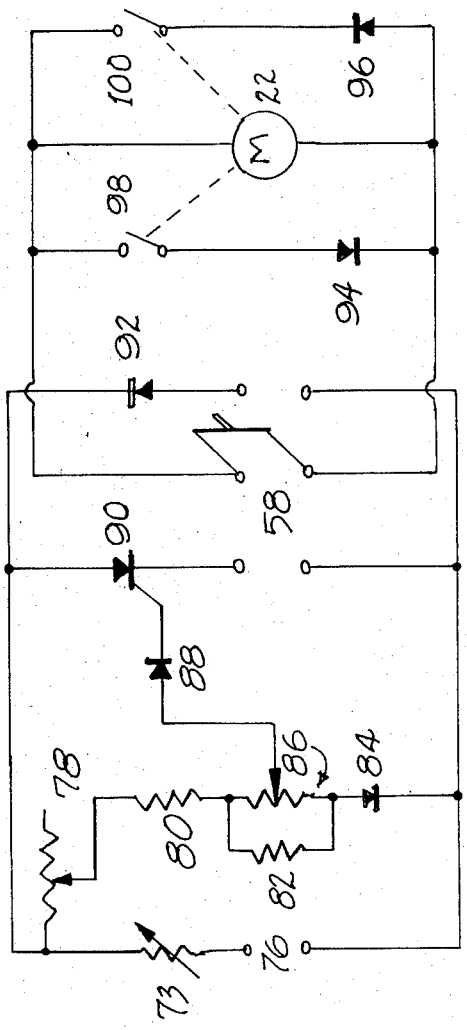
FIG. 6 is an electrical schematic of the electric circuit used for control of the mechanism.

As illustrated in FIGS. 1 and 2, the dynamic reading pacer device comprises a special housing composed of nearly identical cast members 64 and 62 which provide the appropriate tilt when assembled as shown to the reading material to allow a comfortable reading angle for the operator. The housing provides a special recessed reading material surface 70 to allow insertion and holding of reading material. Slots adjacent to the recessed reading material surface 70 on either side thereof in the top housing 62 allow each tension arm 42 to protrude from the top housing so that each can be attached to the pacer bar 36 at its outer ends permitting the pacer bar to pivot as required. The inner part of each tension arm 42 is attached to the carriage 46 as shown in FIG. 3. Each carriage is restrained to slide on rails one of which is shown at 68 which are integral parts of the top housing 62. Each carriage 46 is driven by flexible drive elements 18 and 20, and the motor pulley 24 which then drive the pulleys 12, 14 and 16.

Reading material such as a book 48 inserted in the recessed reading material surface 70 of the top housing 62 and beneath the pacer bar 36 will be traversed by said pacer bar in its movement with said tension arms 42 on which it is mounted, the axial pivoting of said pacer bar 36 enabling it to adjust itself on the reading material 48 which is permitted by rotation of the tension arms 42 on shafts, one of which is shown at 43 in FIG. 3 within the carriages 46. The pacer bar's direction of travel is controlled by a three position switch 58. The center position of this switch permits the operator to stop said pacer bar. The reading speed is indicated by the dial 56 on potentiometer 86 if the potentiometers 78 and 86 are respectively adjusted to correspond to the number of words in a given area (vis: words per inch of reading material surface) and the operators reading ability. Dial 56 is calibrated in words per minute and corresponds to potentiometer 86 while dial 54 is calibrated in words per inch and corresponds to potentiometer 78.

The pacer bar 36 may be of any desired form, viz., it may be of plastic or of wire or a transparent bar member.

Storage of a required electrical outlet and other materials such as instruction manuals may be stored in the bottom housing 64 not used for the pacer bar and drive mechanism. The bottom has a cover 72 and is attached to the bottom housing 64 utilizing suitable fasteners.

The housing or casing comprises two housing sections 62 and 64, integral housing handle 60, two integral raised cam surfaces 40 and necessary fittings to allow attachment of the drive mechanism and control electronics.

As shown in FIG. 3, a typical installation of the pacer bar 36 to the drive mechanism requires the attachment of tension arm 42 to pacer bar 36 using retainer ring 38 and said arm to the carriage 46 using spring 52 and collar 44. With the carriages mounted to slide on rails as at 68 in FIG. 2, and with the pacer bar 36 perpendicular to the rails 68, each carriage is attached to their respective flexible drive elements 18 and 20 including resilient parts 32 and 34 whose purpose is to provide sufficient flexure in the element during assembly, and utilize spring clips 50 and 110 with suitable hardware. Although not shown, the carriages are attached to top strands of the flexible drive elements 18 and 20 directly behind resilient parts 32 and 34 (FIG. 5).

FIG. 4 shows a side view of the pacer bar 36 in two positions of operation. One position (solid lines) illustrates the manner in which said pacer bar leaves the reading material 48 and is elevated up and away on the raised cam surfaces; the other position (dotted lines) shows the pacer bar at its upper limit of travel tilted to provide clearance for page turning and/or reading material removal.

The components of the drive mechanism are shown in FIG. 5. The pulley 24 is attached to motor/gear box 22 using fastener 26. Likewise, pulleys 14 and 16 are attached to shaft 104 using fasteners 28 and 30 and this sub-assembly is attached to said housing in a bearing surface formed in the two housings. Another idler pulley 12 is allowed to rotate freely on shoulder bolt 102 which is fastened to said housing using nut 106.

It is understood that the operator utilizes three basic controls located on the said housing (FIG. 1), i.e., the three position switch, words per inch potentiometer that is adjusted for the type reading material and the words per minute potentiometer that is adjusted for the reader's speed capability. The operator establishes his reading speed by adjusting the reading speed potentiometer (viz. words/minute) to equate the pacer bar movement rate to his reading speed capability. The voltages of the potentiometers are combined to produce the quotient of words per minute and words per inch to provide a functional output of inches per minute or speed. The resultant output voltage is fed to the electronic controller to establish a pacer bar speed that corresponds to a given number of words per minute for a particular type of reading material. When the pacer bar reaches either limit of travel, an appropriately designed limit switch turns the motor off. The motor/gear box preferably contains a slip clutch to protect the gearing if the pacer bar is forcefully stopped at any other position although it is not essential for normal operation.

The computerized electronic controller system as shown in FIG. 6 consists of resistors 80 and 82, adjustable resistor 73, potentiometers 78 and 86, rectifiers 84, 88, 92, 94 and 96, silicon controlled rectifier 90, motor/gear box 22, three position switch 58 and limit switches 98 and 100. The adjustable resistor 73 provides a convenient means of calibrating the circuit voltage to properly adjust the scale of the system but could be eliminated by proper selection of circuit elements. The voltages from the "words per inch" potentiometer 78 and "words per minute" potentiometer 86 are electrically combined to form the analog quotient or together establish a voltage that is a function of inches per minute that is provided as an input to the electronic controller. The said input voltage appears at the wiper terminal of potentiometer 86 and is used to vary the electrical conduction angle of the silicon controlled rectifier 90 (SCR), and usually requires the use of resistor 82 across the terminals of potentiometer 86 for adjusting the liniarity of the SCR operation. All rectifiers except the SCR could be the same type. Rectifier 92 is used to provide negative half wave pulses for the quick return of the pacer bar 36. The rectifiers 94 and 96 in the limit switch circuits permit stopping the motor by a shorting bar technique, since the said switches are the normally open type. The motor/gear box 22 contains a variable speed motor of either D.C. or universal type with suitably attached gear train. The three position switch permits directional control of the motor.

During normal operation, the three position switch is placed in the "Down" position after the pacer bar is rapidly reversed to the top of the reading material 48; the pacer bar's downward rate is proportional to the magnitude of the conduction angle of the SCR 90. The electrical conduction angle (or the number of electrical degrees of applied waveform during which the SCR is conductive) therefore determines the total impulse fed to motor which then establishes motor velocity. The use of counter emf produced by a rotating motor armature indicates the speed changes for mechanical load variations. The circuit utilized is a basic SCR control with voltage feedback and is highly effective for the type of motor employed. The gate firing circuit required in this type of control circuit is a resistive network consisting of the resistances 78, 86, 80 and 82 in addition to the adjacent rectifiers 84 and 88. Other switch positions were described above. The advantage of the limit switch SCR rectifier arrangement is that it permits dynamic braking and therefore faster stopping of the motor.

The machine as described above is of a convenient, lightweight, durable, compact construction and is a practical embodiment but it will be understood that various modifications may be made without departing from the spirit of the invention as defined in the claims.

What is claimed is:

1. A pacer device comprising:
   a housing having means for supporting reading material thereon,
   a pacer bar mounted on said housing for movement across the reading material between an upper and lower limit of travel,
   a means for controlling the movement of said pacer bar including a variable speed electric motor having an output drivingly connected to said pacer bar,
   a circuit means connected to said motor and including switching means having a first position for driving said motor in one direction, a second position for driving said motor in a reverse direction and a third position for stopping said motor,
   said circuit means further including means for varying the speed of said motor including a first control element which is manually variable to correspond to the number of words per unit area of reading material traversed by said pacer bar, and a second control element cooperating with said first control element and which is manually variable to vary the speed of said motor.

2. The device as claimed in claim 1 wherein said housing is provided with a pair of guide rails formed integrally therewith and two carriage assemblies are provided, each mounted on a respective guide rail and slidably moveable there along, each of said carriage assemblies having a spring biassed tension arm pivotably attached thereto, said pacer bar having one end pivotably attached to one tension arm and its other end pivotably attached to the other tension arm.

3. The device as claimed in claim 2 where said means for supporting reading material comprises a substantially flat surface formed in said housing and extending between said guide rails, said surface being recessed with respect to the exterior surface of said housing.

4. The device as claimed in claim 3 wherein cam surfaces are provided adjacent one of said limits of travel of said pacer bar to move said pacer bar off of the reading material supported on said surface when said pacer bar reaches said one limit of travel.

5. The device as claimed in claim 2 wherein two pairs of pulleys are rotatably mounted in said housing, one pair being mounted in spaced apart parallel relation adjacent said upper limit of travel, the other pair being mounted adjacent said lower limit of travel in spaced apart parallel relation, 6. The device as claimed in claim 1 wherein said housing comprises two substantially identically formed portions, one portion having said pacer bar mounted thereon and said other portion adapted to provide a closure member when attached to one side of said first portion and to provide a support when attached to the other side of said first portion. one of said pulleys being drivingly connected to said output of said motor, a first flexible belt being provided connecting said one pulley to one other of said pulleys mounted adjacent a limit of travel different from that of said one pulley, said one other of said pulleys being drivingly connected to its said spaced apart pulley and said last mentioned pulley being connected to said remaining pulley by a second flexible belt, one of said carriage assemblies being attached to said first belt and the other of said carriage assemblies being connected to said second belt in spaced parallel relation to said one carriage assembly.

7. The device as claimed in claim 1 wherein a pair of limit switches are provided, one adjacent each limit of travel of said pacer bar for stopping said motor upon movement of said pacer bar to either of said limits of travel.

8. The device as claimed in claim 1 wherein said second control element of said means for varying the speed of said motor/gear box comprises a first potentiometer connected with a rectifier in one leg and another rectifier in the output of said second potentiometer all of which being connected in parallel with said motor/gear box.

9. The device as claimed in claim 8 wherein the said first control element of said means for varying the speed of said motor comprises a second potentiometer connected in series with the output of the first potentiometer, said second potentiometer having its output connected to the control terminal of a silicon controlled rectifier, power terminal of the silicon controlled rectifier being connected in series with said motor/gear box.

10. A pacer device comprising a housing having a pair of guide rails formed integrally therewith and two carriage assemblies, each mounted respectively on one of said guide rails and slidably movable there along between an upper and lower limit of travel, each of said carriage assemblies having a spring biassed tension arm pivotably attached thereto, a pacer bar having one end pivotably attached to one tension arm and its other end pivotably attached to the other tension arm,
   means on said housing for supporting reading material for traversal by said pacer bar, means for moving said carriage assemblies including two pairs of pulleys each of which is rotatably mounted in said housing, one pair being mounted in spaced apart parallel relation adjacent said upper limit of travel and the other pair being similarly mounted adjacent said lower limit of travel, one of said pulleys being drivingly connected the output of a variable speed electric motor, a first flexible belt connecting said one pulley to one other of said pulleys mounted adjacent a limit of travel different from that of said one pulley, said one other of said pulleys being drivingly connected to its said spaced apart pulley, and said last mentioned pulley being connected to said undriving pulley by a second flexible belt, one of said carriage assemblies being attached to said first belt and the other of said carriage assemblies being connected to said second belt in spaced parallel relation to said one carriage assembly, circuit means connected to said motor and including switching means having a first position for driving said motor in one direction, a second position for driving said motor in a reverse direction and a third position for stopping said motor, cam surfaces carried on said housing adjacent one of said limits of travel and cooperating with said pacer bar whereby said pacer bar will be moved off of reading material supported on said housing when said pacer bar moves to said one limit of travel, said circuit means further including means for varying the speed of said motor including a first control element having manually variable means for compensating for the number of words per unit of area of reading material traversed by said pacer bar and a second control element cooperating with said first control element and which is manually variable to vary the speed of said motor.

* * * * *